E. H. SCHWARZ.
TIRE FOR WHEELS AND MEANS FOR RETAINING THE SAME.
APPLICATION FILED JUNE 29, 1914.

1,195,512.  
Patented Aug. 22, 1916.

WITNESSES:  
L. H. Latimer  
J. S. McCarthy

INVENTOR  
Elmer N. Schwarz  
BY Edwin W. Hammer.  
ATTORNEY

UNITED STATES PATENT OFFICE.

ELMER H. SCHWARZ, OF NEW YORK, N. Y.

TIRE FOR WHEELS AND MEANS FOR RETAINING THE SAME.

1,195,512.  Specification of Letters Patent. Patented Aug. 22, 1916.

Application filed June 29, 1914. Serial No. 847,856.

*To all whom it may concern:*

Be it known that I, ELMER H. SCHWARZ, a citizen of the United States, residing at New York city, in the county of New York and State of New York, have invented certain new and useful Improvements in Tires for Wheels and Means for Retaining the Same, of which the following is a specification.

My invention relates to vehicle tires made of solid rubber or similar acting resilient material, and its object is to provide improved means whereby the tires can be securely connected to the wheel rims and can be readily attached to or removed from said rims.

My invention will be pointed out in the claims.

Figure 1:
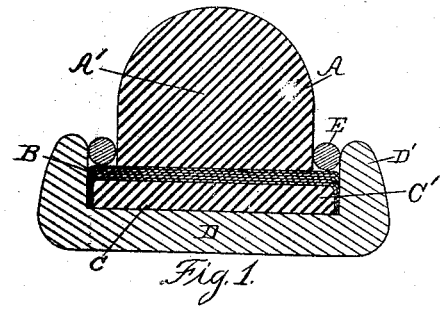
Figure 2:
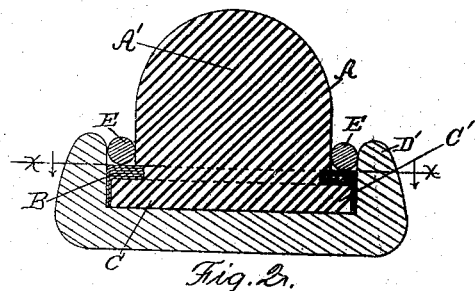
Figure 4:
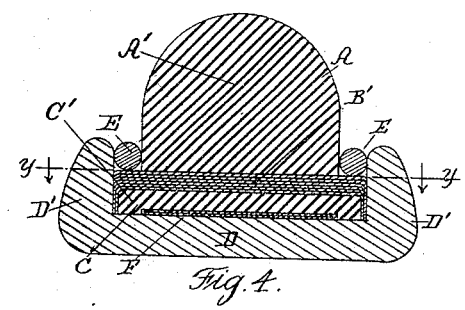
Figure 3:
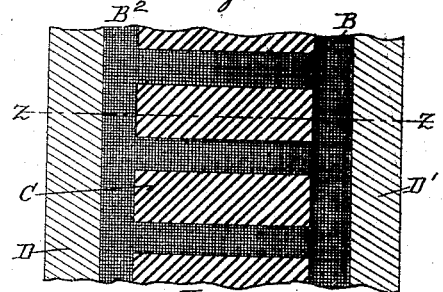
Figure 5:
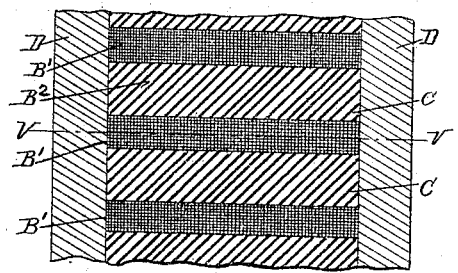
Figure 6:
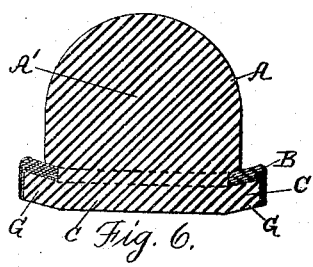

Figures 1, 2 and 4 are transverse sections of the tire, fastening means and rim, which constitute three forms of my invention. Fig. 3 is a longitudinal section along the line $x\ x$ of Fig. 2, Fig. 5 is a longitudinal section along the line $y\ y$ of Fig. 4, and Fig. 6 is a transverse section of the tire of Fig. 2, when removed from the rim.

My invention is particularly applicable to tires which employ side wires as a holding means. Such tires have side flanges or extensions over which preferably endless wires or hoops are sprung when the tires are in place on the rims. I do not wish to limit myself, however, to this form of holding means as the construction which I have shown could be advantageously employed with other forms.

Heretofore in solid rubber tires with side flanges it has been customary to have the retaining wires bear directly on the rubber flanges with the result that the tires ultimately deteriorated at these points because the wires cut into the rubber and this cutting, together with the heat of friction weakened the tire at the holding points. This defect has been remedied to a slight degree by providing a heavy fabric at the base of the tire extending under the flanges, but this improvement was to some extent offset by the consequent reduction in thickness of the rubber flanges which gave less rubber for the wires to wear through.

In my improved form of tire, I insert a stiffener of canvas or other textile fabric between the side wires and the rubber flanges. The wires rest directly on the fabric with the result that the tire is firmly held in place on the rim and there can be no cutting of the flanges by the wires or slipping of the wires thereon. This principle is employed in my several forms of tires which will be now described.

In Fig. 1, A is the tire made of solid rubber or other resilient material, B is a fabric stiffener vulcanized with the tire, which extends completely around and across the tire and over the side flanges C' of the same and between the tread A' and the base portion C of the tire. The tire rests on the rim D of the wheel between the flanges D'. Between the flanges D' and the tread A' of the tire A are the retaining wires E which are of any desired shape or form but are preferably endless and are slipped over the flanges D' after the tire is in place on the rim. The wires are of slightly less diameter than the tops of the flanges D' and the resiliency of the rubber flanges C' below the fabric B allows the wires E to be lifted over the rim when properly manipulated. The fabric B not only protects the rubber flanges C' of the tire but acts as a stiffener for the base, preventing lateral compression and preventing the tire from springing out of the rim under excessive lateral strains. In endless tires the fabric also prevents creeping of the tire along the rim since the fabric is non-elastic and at the same time the elasticity of the base C allows the tire to be readily slipped on and off the rim.

Fig. 2 shows a tire similar to that of Fig. 1 except that the fabric B has openings cut therein so as to allow the rubber of the tread A' of the tire and of the base C to be continuous and not entirely separated by the fabric B. This is well shown in the longitudinal section, $x\ x$ Fig. 3, where the fabric is of ladder-like construction. The wires E rest on the sides of the ladder and the steps of the ladder which extend across the tire render the whole structure rigid. It is obvious that the steps of the ladder might project beyond the sides and the projecting ends form the supports for the wires E.

In the form shown in Figs. 4 and 5 the sides of the fabric ladder between the steps are omitted so that the fabric B is not continuous around the tire as in Fig. 2 but is divided into a number of unconnected cross strips or portions B'. The wires E rest on the ends of these strips. With this construction there are rubber portions of the flanges C' of the tire which are in direct contact with the holding wires E between the fabric strips B'. Consequently in this case, the fabric B' can be thicker and at the same time as great a resiliency of the flanges obtained as in the construction of Figs. 1 and 2. The increased thickness of the fabric B' in Fig. 4, insures proper rigidity to the base portion of the tire, but in this form I prefer to add a thin fabric F to prevent creepage; this extends around the tire.

Fig. 6 is a transverse section of the tire of Fig. 2 when removed from the rim of the wheel. The outer portions G of the lower surface of the tire are beveled off and the upper surface of the flanges C' of the tire directly above are preferably made parallel with the beveled portions G of the lower surface. By beveling the portions G an open space is provided between these portions and the rim of the wheel when the tire is put in place on the rim. Consequently the tire flanges C' can be more easily depressed by this construction, when the holding wires E are sprung over them because there is a lever action which causes a compression between the beveled flanges and the straight portion of the base and this is more powerful than merely a straight downward compression of the rubber flange as in flanges without the bevel. This "around the corner action" has an additional advantage in that it causes the pressure of the wires E to be exerted obliquely toward the center of the base of the tire and acts to hold the tire more firmly in place than if the pressure was exerted only in a vertical direction. In other words, where the flanges are beveled, the pressure on the base of the tire due to the wires E is more evenly distributed along the entire width of the base and where there is no beveling the pressure is mostly on the flanges C' and the strain is consequently greatest on the flanges themselves which are the weakest parts of the tire. I prefer to bevel the lower portion of the flanges of the tire in all of the forms shown and I claim this as part of my invention.

I do not wish to limit myself to the exact constructions described, as modifications could be made which would not depart from the spirit of my invention.

What I claim as new and desire to secure by Letters Patent of the United States is—

1. A tire having a tread, base portion and side flanges made of resilient material and having a textile fabric, incorporated therewith, the main portion of which fabric is placed between the tread and base portion of the tire and extends entirely across the tire and terminates on top of the flanges, said main portion of the fabric having a number of openings therein.

2. A tire having a tread, base portion and side flanges made of resilient material and a layer of textile fabric placed between the tread and base portion and extending across the tire and over the upper surface of said flanges, the lower surface of said flanges being beveled for the purposes set forth.

3. The combination of a vehicle wheel having a recessed rim, a tire made of resilient material located in said recess, flanges on the sides of said tire, a layer of textile fabric incorporated with said tire and covering the flanges, holding means for the tire engaging the textile fabric on the upper surface of the flanges, and cut-away portions on the lower surface of the tire below the flanges, the pressure of said holding means being exerted in a direction tending to depress the said cut-away portions into alinement with the rest of the lower surface of the tire.

4. The combination of a vehicle wheel having a rim, a tire made of resilient material mounted on said rim, flanges on the sides of said tire, holding means for the tire engaging the flanges, and beveled portions on the lower surface of the tire below the flanges, the pressure of said holding means being exerted in a direction tending to depress the said beveled portions into alinement with the rest of the lower surface of the tire.

5. A tire having a tread, base portion and side flanges made of resilient material and a fabric stiffener of substantial thickness extending entirely across the tire between the tread and base portion, the fabric extending over the side flanges and adapted to be engaged by holding means on the flanges to the end that the pressure exerted by said holding means on the fabric will be transmitted directly to the base portion of the tire to hold the same firmly against the wheel rim on which it is adapted to be mounted.

6. The combination of a wheel having a rim, a tire having a tread, base portion and side flanges made of resilient material mounted on said rim, a series of fabric strips embedded in said tire between the tread and base portion and extending uninterruptedly across the tire and over the side flanges and holding means for the tire engaging the flanges and exerting a downward pressure on the fabric strips entirely across the tire.

7. The combination of a wheel having a rim, a tire made of resilient material mounted on said rim and comprising a tread, a base portion and side flanges and a fabric stiffening material of substantial thickness incorporated with the tire and extending entirely across the tire between the tread and base portion and over the side flanges, and holding means for the tire engaging the flanges and exerting a downward pressure on the fabric toward the rim of the wheel.

8. A resilient tire adapted to be attached to the rim of a wheel, said tire having side flanges which are inclined upward from the base of the tire when the tire is unmounted and are adapted to be depressed into alinement with the base when the tire is attached to the rim.

In witness whereof I have hereunto set my hand this 26th day of June, 1914.

ELMER H. SCHWARZ.

Witnesses:
L. H. LATIMER,
J. S. McCARTHY.

Copies of this patent may be obtained for five cents each, by addressing the "Commissioner of Patents, Washington, D. C."